United States Patent
Ellis et al.

(10) Patent No.: US 10,507,754 B2
(45) Date of Patent: *Dec. 17, 2019

(54) ERGONOMICALLY IMPROVED SYSTEMS AND METHODS FOR DELIVERING PRODUCTS FROM A DELIVERY VEHICLE

(71) Applicants: Manuverate, LLC, York, PA (US); Sharon Loy, York, PA (US)

(72) Inventors: Gregory Paul Ellis, York, PA (US); Ned F Bauhof, III, York, PA (US); Andrew Nicholas Yankanich, York, PA (US); Mathew Edwin Ellis, York, PA (US); David Loy, York, PA (US)

(73) Assignee: Manuverate, LLC, York, PA (US)

( * ) Notice: Subject to any disclaimer, the term of this patent is extended or adjusted under 35 U.S.C. 154(b) by 1202 days.

This patent is subject to a terminal disclaimer.

(21) Appl. No.: 14/727,387

(22) Filed: Jun. 1, 2015

(65) Prior Publication Data
US 2015/0336497 A1 Nov. 26, 2015

Related U.S. Application Data

(63) Continuation of application No. 13/187,871, filed on Jul. 21, 2011, now Pat. No. 9,073,470.

(51) Int. Cl.
*B60P 1/02* (2006.01)
*B60P 1/38* (2006.01)
(Continued)

(52) U.S. Cl.
CPC ........ *B60P 1/02* (2013.01); *B60P 1/38* (2013.01); *B60P 3/007* (2013.01); *G06Q 10/0833* (2013.01)

(58) Field of Classification Search
CPC .............. B65G 47/515; B65G 47/5181; B65G 47/5159; B65G 1/026; B65G 1/10; B65G 1/127
See application file for complete search history.

(56) References Cited

U.S. PATENT DOCUMENTS 2,779,487 A 1/1957 Harris
2,832,636 A 4/1958 Black
(Continued)

FOREIGN PATENT DOCUMENTS

DE 8907876 U1 6/1989
DE 19809291 A1 3/1998
(Continued)

OTHER PUBLICATIONS

European Patent Office, European Search Report for corresponding EP Application No. 12814322 dated Oct. 14, 2015, 1pg.
(Continued)

*Primary Examiner* — Mark C Hageman
(74) *Attorney, Agent, or Firm* — Duane Morris LLP

(57) ABSTRACT

A method and system for providing cargo or product to an individual. The system may be a vehicle and include a plurality of bays, at least one of the plural bays having two rectangular frames, each frame having two horizontal members and two vertical members and each frame opposing and facing the other. The vehicle may also include a holding structure engaged by both of the rectangular frames, the structure comprising a plurality of trays wherein the structure is adaptable to provide vertical movement of the plural trays within the confines of the two rectangular frames. The vehicle may also include one or more mechanisms positioned between the lower horizontal members of the two rectangular frames, the one or more mechanisms adaptable to provide lateral movement within the confines of the two rectangular frames.

20 Claims, 12 Drawing Sheets

(51) Int. Cl.
    *G06Q 10/08*     (2012.01)
    *B60P 3/00*     (2006.01)

(56) References Cited

U.S. PATENT DOCUMENTS

| | | | |
|---|---|---|---|
| 3,929,371 | A | 12/1975 | Gibson |
| 4,033,620 | A | 7/1977 | Blake et al. |
| 4,139,109 | A | 2/1979 | Murphy |
| 4,294,332 | A | 10/1981 | Ready |
| 4,701,086 | A | 10/1987 | Thorndyke |
| 5,054,295 | A | 10/1991 | Goulooze |
| 5,092,721 | A | 3/1992 | Prince |
| 5,931,262 | A | 8/1999 | Greenlaw et al. |
| 6,033,002 | A | 3/2000 | Clare et al. |
| 6,328,525 | B1 | 12/2001 | Greenlaw et al. |
| 2004/0096303 | A1* | 5/2004 | Resta .......... B65G 1/0435 414/331.13 |
| 2006/0145503 | A1 | 7/2006 | Steffens et al. |
| 2010/0316468 | A1 | 12/2010 | Lert et al. |

FOREIGN PATENT DOCUMENTS

| | | |
|---|---|---|
| EP | 1741594 B9 | 2/2011 |
| GB | 1467476 A | 3/1977 |
| JP | 04110243 A | 4/1992 |
| JP | 0812092 A | 1/1996 |
| JP | 0812220 A | 1/1996 |
| JP | 2000-296995 A | 10/2000 |
| JP | 3133872 U | 7/2007 |
| WO | 88/00538 A1 | 1/1988 |

OTHER PUBLICATIONS

"Carton Flow Track Keeps Groceries Moving," Material Handling Engineering 51.5 (1996): 93. ProQuest. Web. May 5, 2015, 6pgs.
International Searching Authority, International Search Report for PCT/US2012/047316 dated Jan. 29, 2013, 1 pg.

* cited by examiner

ERGONOMICALLY IMPROVED SYSTEMS AND METHODS FOR DELIVERING PRODUCTS FROM A DELIVERY VEHICLE

CROSS REFERENCE TO RELATED APPLICATIONS

The present application is a continuation application of U.S. patent application Ser. No. 13/187,871 entitled "ERGONOMICALLY IMPROVED DELIVERY VEHICLE AND METHOD" filed Jul. 21, 2011, the entirety of which is herein incorporated by reference.

BACKGROUND

The present subject matter relates to delivery vehicles. More particularly, the present subject matter relates to delivery vehicles having multiple tiers of storage which may be accessed for loading and delivery purposes through rear or side doors.

It is desirable to store and transport a wide variety of cargo in vehicles having multiple storage tiers so that an efficient use of the interior space in the vehicle may be made. In many distribution industries, single tier delivery vehicles suffer from several shortcomings which results in an inability to utilize the full capacity of the cargo area, results in possible injury to the driver, and results in an overall inefficiency in the loading and delivery process. For example, one such shortcoming is that stacking cargo or product to an excessive height introduces potential payload instability and/or damage to the respective cargo or product. The terms cargo, product, and case may be used interchangeably in this disclosure and such use should not limit the scope of the claims appended herewith. Another shortcoming is that excessive or inefficient stacking may result in a cumbersome access for manual unloading.

Thus, it is desirable to provide a system for raising and lowering cargo or product such that certain tiers may be loaded or unloaded from the lower level thereof. Multi-tier storage of cargo or product is known in the art. For example, it is known to provide upper and lower fixed storage platforms in a multi-tier cargo storage vehicle, as described in U.S. Pat. No. 4,139,109 to Murphy and U.S. Pat. No. 3,929,371 to Gibson. A variety of arrangements have been developed to overcome certain disadvantages of fixed tiers for multi-tier storage as disclosed in U.S. Pat. No. 2,779,487 to Harris, U.S. Pat. No. 2,832,636 to Black, U.S. Pat. No. 4,701,086 to Thorndyke, U.S. Pat. No. 5,931,262 to Greenlaw and U.S. Pat. No. 5,092,721 to Prince. These references, however, fail to address several inefficiencies present in the loading and delivery process described above and fail to address the injury issues with individuals who may be tasked to deliver and unload the product.

For example, a conventional delivery or direct-store-delivery (DSD) individual may generally be responsible for driving a pre-stocked route delivery vehicle from a warehouse to customers, unloading various product from the vehicle, delivering the product into customers' places of business, stocking shelves and displays within the customers' locations, and retrieving company merchandise including point-of-sale material, delivery containers, and damaged product. These individuals typically work eight to ten hours per day delivering to a variety of locations such as, but not limited to, grocery stores, convenience stores, hospitals, schools, and the like where, during a typical day, the individual may manually lift 200 to 600 cases of product, one at a time, and place the product onto a hand truck or other device. Upon transferring the hand truck into a customer's location, the individual may then manually unload the product therefrom onto shelves and/or into storage areas. This entire process provides a large number of inefficiencies into a distribution system.

Furthermore, conventional delivery vehicles are generally tall and contain deep and high cargo bays. These conventional bays are often seven feet high, forty inches wide and forty inches deep. Thus, the dimensions of the bay alone provide ergonomic issues such as removing product, opening/closing doors, and other ergonomic issues related to tall vehicles. Additional issues may also relate to performance, productivity, capacity and/or payload issues.

For example, with regard to the ergonomic issue of removing product, an individual must perform repeated, extended, and elevated reaches to access and lift product out of vehicular bays. With regard to the ergonomic issue of opening/closing doors, individuals must use repeated, extended and elevated reaches to open and close large, heavy bay doors. With regard to the ergonomic issue of tall vehicles, the vehicle employed for delivery may require an individual to reach up and pull beverages down, lift a load from high elevations to the ground, and may require an individual to lift empty containers up into the vehicle. Each of these movements places considerable stress on the individual's shoulders, elbows and lower back. This repetitive motion induces excess strain and sprain on the individual which is the principle condition of injury for 60% of reported injuries in the industry. Of these reported injuries, 50% are related to an individual's back and other portions of the trunk, 20% are related to lower extremities, and 20% are related to upper extremities. A recent case study was performed in which it was found that 61% of worker's compensation claims for an independent beer distributor were for these delivery individuals with twelve month worker's compensation claims totaling $478,000 equating to $0.048 per case delivered.

With regard to performance and productivity issues, it was determined that service areas in the industry are limited due to the time required at delivery stops. Independent time studies were performed defining the time required for various tasks associated with deliveries using a conventional delivery vehicle. Table 1 below provides one such exemplary time study.

TABLE 1

| Task | Time | Measure |
| --- | --- | --- |
| Pull Order off Truck | 0:05 | case |
| Stock Backstock | 0:05 | unit |
| Restock Displays | 0:05 | case |
| Stock Cooler | 0:06 | unit |
| Open/Close Door | 0:07 | occurrence |
| Paperwork | 0:07 | occurrence |
| Break Down Empties | 0:30 | stop |
| Roll product inside/stage | 0:34 | stack |
| Collect Money | 1:10 | occurrence |

TABLE 1-continued

| Task | Time | Measure |
| --- | --- | --- |
| Check Order with Manager | 1:42 | occurrence |
| Print Invoice | 2:00 | occurrence |
| Walk | 3:34 | stop |
| Price Order | 4:37 | stop |

With reference to Table 1 above, it was determined that decreasing the time per case for opening/closing doors and pulling cases off of a vehicle may decrease the overall time per stop thereby allowing a company to deliver product to more locations per truck.

With regard to capacity and payload issues, conventional delivery vehicle designs limit the number of cases that are placed onto the vehicle. In certain instances, a labor agreement may also limit the case payload to less than half of the vehicle capacity. Additionally, conventional delivery vehicle designs limit the number of different stock keeping units (SKU) that are placed onto a vehicle. As the number of SKUs being offered by many delivery and distribution companies have tripled in recent years, the conventional delivery vehicle design has remained unchanged thereby introducing a large inefficiency in the distribution system. Further, as case size proliferation is growing in many industries, an additional limitation is also introduced using conventional delivery vehicle capacities.

Considering the historical issues related to side-bay and rear delivery vehicle usage and the associated costs to companies, there have been many attempts to eliminate the aforementioned issues; however, these attempts have been limited to immaterial ergonomic changes for current delivery vehicle designs (e.g., changes in the driver's seat, liners for the bay, etc.), transition from a build-by-bay to a build-by-stop delivery process, and transition of customer deliveries to a rear delivery using alternative delivery methods. With regard to the transition to a build-by-stop process, historically, companies aggregate volume for a single package and place 100% of the volume into a single bay thereby resulting in a "shopping" of the truck by the driver to pull the appropriate volume for each individual stop. By transitioning to a build-by-stop process, each bay was utilized for a single customer stop thereby reducing the number of door opening/closing events. The build-by-stop process, however, fails to address other ergonomic issues and also reduces the capacity of delivery vehicles. With regard to a transition to rear-end deliveries, different delivery technologies have been introduced for use in conjunction with rear load deliveries such as external elevators, different carts, hand trucks, etc. While these technologies may reduce many of the ergonomic issues associated with certain delivery vehicles, this transition to a rear delivery introduces additional limitations in that not all customer locales accept rear-end load vehicles, any creation of customer specific orders may add significant cost to the warehouse operation, the additional cost to purchase, store, and maintain the new delivery equipment, and the current trend towards smaller order quantities is generally making these technologies obsolete.

Clearly, there is a need in the art to overcome the inefficiencies and problems in the art. Thus, there is a need in the art to provide a material change to the mechanical design of conventional delivery vehicles. There is also a need in the art to address the ergonomic, performance, productivity, capacity and payload issues and problems present in the industry.

Accordingly, one embodiment of the present subject matter provides a delivery vehicle comprising a bay having two parallel rectangular frames, each frame having two horizontal members and two vertical members and each of the frames opposing and facing the other, wherein at least two of the vertical members include a linear gear affixed to a portion of the length of the respective vertical member. The bay further includes a holding structure engaged by both of the rectangular frames. The holding structure may include a first horizontal frame adjacent each of the vertical members of the two rectangular frames at corners of the first horizontal frame, and a first motor adaptable to engage a shaft, the shaft having a gear on opposing ends thereof, each gear rotatably engaged to the linear gear of a respective vertical member. The bay may also include a first belt positioned between the lower horizontal members of the two rectangular frames wherein operation of the first motor provides vertical movement of the holding structure within the confines of the two rectangular frames and operation of the first belt provides lateral movement within the confines of the two rectangular frames.

Another embodiment of the present subject matter provides a system for delivery of products from a wheeled vehicle having one or more delivery bays. The system may include vertical frames in at least one of the bays, the frames carrying a holding structure providing vertical movement of the products within the vehicle and may include a belt assembly providing lateral movement of the products within the vehicle.

An additional embodiment of the present subject matter may provide a delivery vehicle comprising a plurality of bays, at least one of the plural bays including two rectangular frames, each frame having two horizontal members and two vertical members and each frame opposing and facing the other. The vehicle may also include a holding structure engaged by both of the rectangular frames, the structure comprising a plurality of trays wherein the structure is adaptable to provide vertical movement of the plural trays within the confines of the two rectangular frames. The vehicle may further include one or more mechanisms positioned between the lower horizontal members of the two rectangular frames, the one or more mechanisms adaptable to provide lateral movement within the confines of the two rectangular frames.

A further embodiment of the present subject matter provides a method for loading products in a vehicle or delivering products to an individual from the vehicle. The method may include the steps of operating one or more mechanisms and imparting vertical and lateral motion to a product within a bay of the vehicle using the one or more mechanisms. An exemplary vehicle may include at least one bay having two rectangular frames, each frame with two horizontal members and two vertical members and each frame opposing and facing the other. The vehicle may also include a holding structure engaged by both of the rectangular frames, the structure comprising one or more horizontal trays having the product contained thereon.

Yet another embodiment of the present subject matter may provide a method for tracking the delivery of products to a customer. The method may include the steps of assigning a code to identify a product, loading the product into a delivery vehicle having one or more delivery bays, the one or more delivery bays having vertical frames carrying a holding structure and having a belt assembly. The method may further include unloading the product from the delivery vehicle and tracking the delivery of the product using the code where at least one of the loading or unloading further comprises providing vertical movement of the product using the holding structure and providing lateral movement using the belt assembly with the one or more delivery bays of the vehicle.

These embodiments and many other objects and advantages thereof will be readily apparent to one skilled in the art to which the invention pertains from a perusal of the claims, the appended drawings, and the following detailed description of the embodiments.

DETAILED DESCRIPTION

With reference to the figures where like elements have been given like numerical designations to facilitate an understanding of the present subject matter, the various embodiments of an ergonomically improved delivery vehicle and methods are herein described.

While the following description may reference a truck or a side-bay delivery vehicle, this in no way should be interpreted as limiting the scope of the claims appended herewith. As is known to those of skill in the art, other delivery vehicles may include rear-loaded or combination side-bay and/or rear-bay or rear-loaded vehicles (e.g., hybrid), trucks, vans and other such wheeled vehicles. Additionally, while the following description may reference beverage containers, cases and the like; however, this also should not limit the scope of the claims appended herewith as embodiments of the present subject matter are equally applicable to containers, cases, product, and/or cargo for delivery vehicles in the dairy industry, vending machine industry, bakery industry, snack food industry, and any industry, whether consumable or otherwise, that may utilize a side-bay and/or rear-loaded delivery vehicle.

Figure 1:
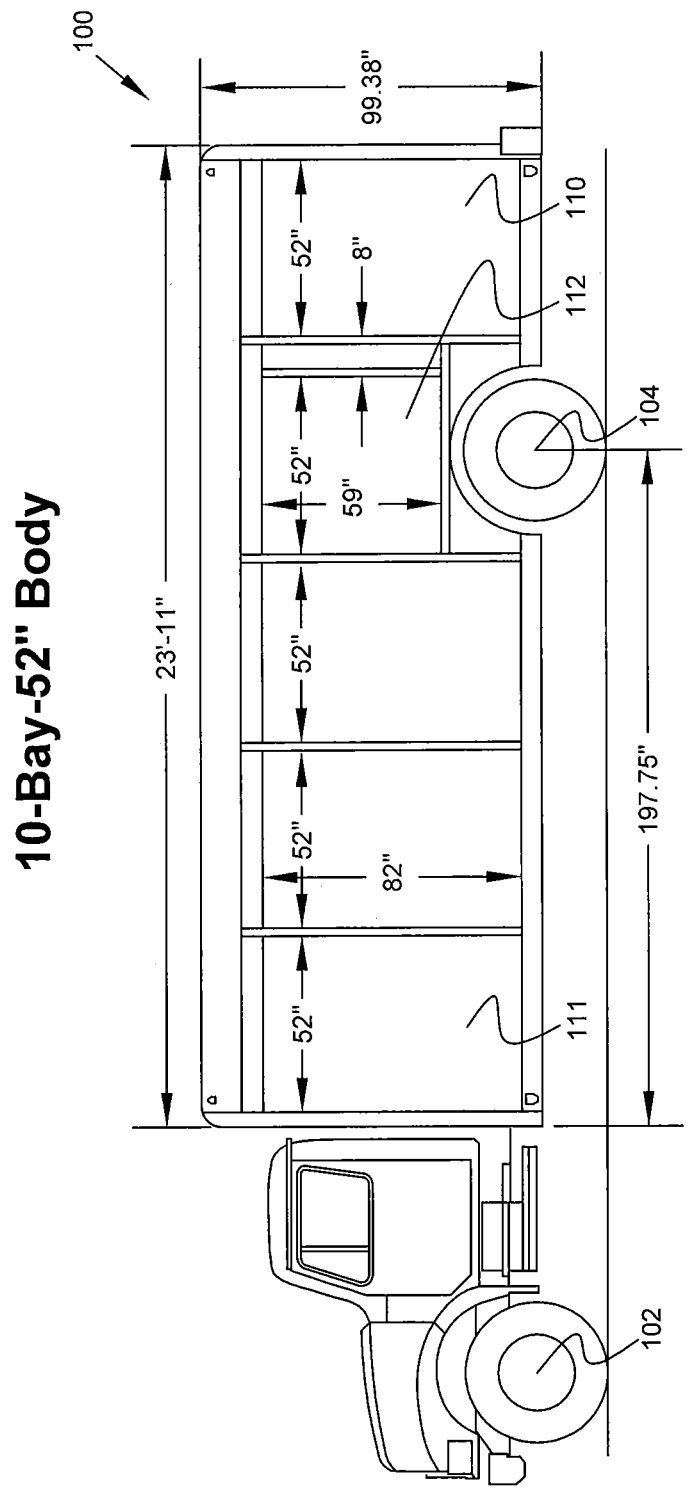
FIG. 1 is a depiction of a side-bay delivery vehicle according to an embodiment of the present subject matter.

FIG. 1 is a depiction of a side-bay delivery vehicle according to an embodiment of the present subject matter. With reference to FIG. 1, an exemplary side-bay delivery vehicle 100 may include ten bays 110, five bays on one side of the vehicle 100 and five bays (not shown) on the opposite side of the vehicle 100. Any one or several of these bays may be standard, insulated, isolated and/or access thereto may be achieved via a side roll-up or swing door. While not shown, and dependent upon the configuration thereof, any number of these bays 110 may be accessible via a rear roll-up or swing door. Table 2 below provides typical capacity, payload and weight data for such a vehicle 100.

TABLE 2

| | | | | Typical Weight Distribution (total load on each axle) | | |
|---|---|---|---|---|---|---|
| Body Model | Body Weight lbs [kg] | Case Capacity 12-oz cans | Payload lbs [kg] 12-oz cans | Front Axle lbs [kg] | Rear Axle lbs [kg] | Gross Vehicle Weight lbs [kg] |
| 10-Bay-52" | 3810 [1728] | 1170 | 25320 [11483] | 12824 [5816] | 26549 [12040] | 39373 [17856] |

The data above in Table 2 is exemplary only and should not limit the scope of the claims appended herewith. With reference to FIG. 1, each bay 110 may be approximately fifty two inches wide with eight bays 111 having a height of approximately eighty two inches and the two bays 112 overlying the rear axle 104 having an approximate height of fifty nine inches. A typical body weight of the vehicle 100 may be 3,180 pounds and may provide a capacity of 1,170 cases of 12-oz cans thereby resulting in a payload of approximately 25,230 lbs. The weight distribution of a fully loaded vehicle 100 between the front axle 102 and rear axle 104 may be approximately 32.6% on the front axle 102 and 67.4% on the rear axle 104.

Figure 2:
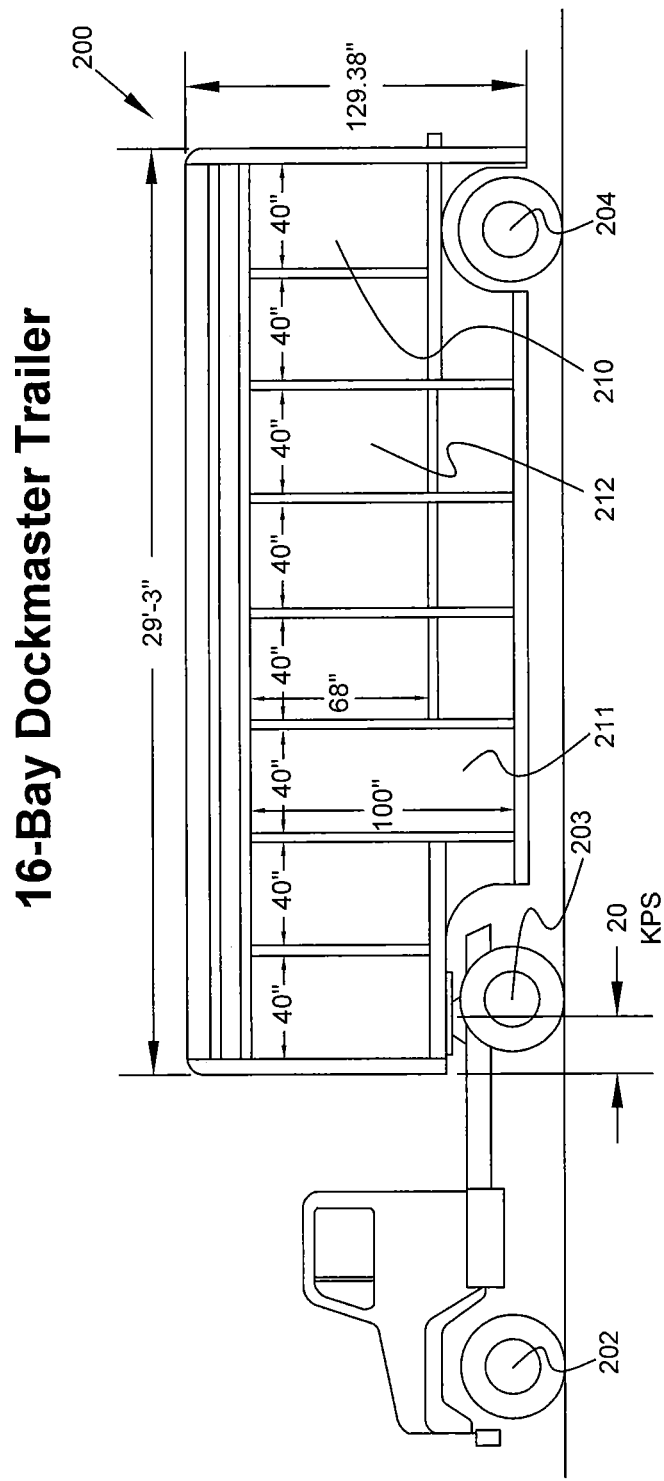
FIG. 2 is a depiction of a side-bay delivery vehicle according to another embodiment of the present subject matter.

FIG. 2 is a depiction of a side-bay delivery vehicle according to another embodiment of the present subject matter. With reference to FIG. 2, an exemplary side-bay delivery vehicle 200 may include sixteen bays 210, eight bays on one side of the vehicle 200 and eight bays (not shown) on the opposite side of the vehicle 200. Any one or several of these bays may be standard, insulated, isolated and/or access thereto may be achieved via a side roll-up or swing door. While not shown, and dependent upon the configuration thereof, any number of these bays 210 may be accessible via a rear roll-up or swing door. Table 3 below provides typical capacity, payload and weight data for such a vehicle 200.

TABLE 3

| Body Model | Body Weight lbs [kg] | Case Capacity 12-oz cans | Payload lbs [kg] 12-oz cans | Typical Weight Distribution (total load on each axle) | | | |
|---|---|---|---|---|---|---|---|
| | | | | Front Axle lbs [kg] | Drive Axle(s) lbs [kg] | Trailer Axle(s) lbs [kg] | Gross Combo Weight lbs [kg] |
| 16-Bay-40" Dockmaster | 9872 [4477] | 1512 | 32552 [14763] | 8233 [3734] | 22480 [10295] | 22701 [10295] | 53414 [24224] |

The data above in Table 3 is exemplary only and should not limit the scope of the claims appended herewith. With reference to FIG. 2, each bay 210 may be approximately forty inches wide with two bays 211 having a height of approximately one hundred inches and the remaining fourteen bays 214 having an approximate height of sixty eight inches. A typical body weight of the vehicle 200 may be 9,872 pounds and may provide a capacity of 1,512 cases of 12-oz cans thereby resulting in a payload of approximately 32,552 lbs. The weight distribution of a fully loaded vehicle 200 between the front axle 202, drive axle(s) 203 and rear axle(s) 204 may be approximately 15.4% on the front axle 202, 42.1% on the drive axle(s) 203 and 42.5% on the rear axle(s) 204.

Figure 3:
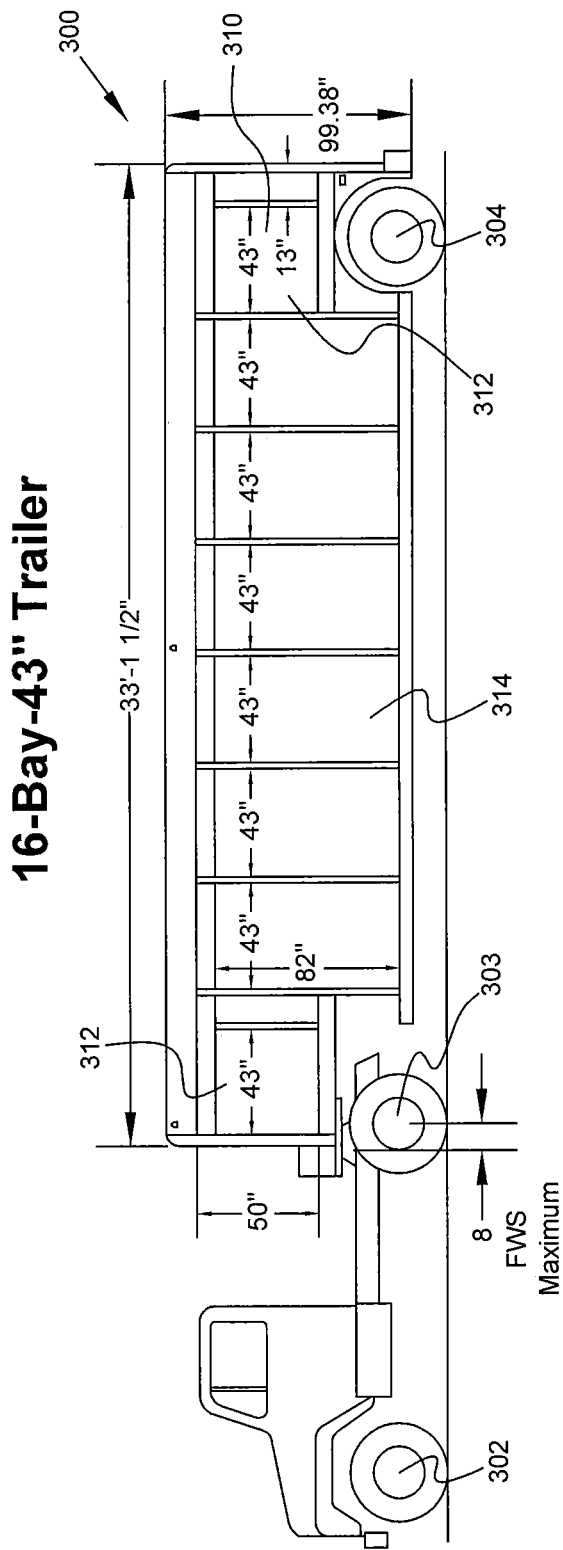
FIG. 3 is a depiction of a side-bay delivery vehicle according to a further embodiment of the present subject matter.

FIG. 3 is a depiction of a side-bay delivery vehicle according to a further embodiment of the present subject matter. With reference to FIG. 3, an exemplary side-bay delivery vehicle 300 may include sixteen bays 310, eight bays on one side of the vehicle 300 and eight bays (not shown) on the opposite side of the vehicle 300. Any one or several of these bays may be standard, insulated, isolated and/or access thereto may be achieved via a side roll-up or swing door. While not shown, and dependent upon the configuration thereof, any number of these bays 310 may be accessible via a rear roll-up or swing door. Table 4 below provides typical capacity, payload and weight data for such a vehicle 300.

TABLE 4

| Body Model | Body Weight lbs [kg] | Case Capacity 12-oz cans | Payload lbs [kg] 12-oz cans | Typical Weight Distribution (total load on each axle) | | | |
|---|---|---|---|---|---|---|---|
| | | | | Front Axle lbs [kg] | Drive Axle(s) lbs [kg] | Trailer Axle(s) lbs [kg] | Gross Combo Weight lbs [kg] |
| 16-Bay-43" | 9033 [4097] | 1472 | 31712 [14382] | 7300 [3310] | 21131 [9583] | 22748 [10317] | 51179 [23210] |

The data above in Table 4 is exemplary only and should not limit the scope of the claims appended herewith. With reference to FIG. 3, each bay 310 may be approximately forty inches wide with four bays 312 having a height of approximately thirteen inches and the remaining twelve bays 314 having an approximate height of eighty two inches. A typical body weight of the vehicle 300 may be 9,033 pounds and may provide a capacity of 1,472 cases of 12-oz cans thereby resulting in a payload of approximately 31,712 lbs. The weight distribution of a fully loaded vehicle 300 between the front axle 302, drive axle(s) 303 and rear axle(s) 304 may be approximately 14.3% on the front axle 302, 41.3% on the drive axle(s) 303 and 44.4% on the rear axle(s) 304.

It should be noted, however, that the delivery vehicles 100, 200, 300 depicted in FIGS. 1-3 are exemplary only and should not limit the scope of the claims appended herewith as one of ordinary skill would understand that the present subject matter may be employed in a myriad of delivery vehicles having different numbers of bays and having bays with a wide variety of dimensions. For the sake of brevity, Table 5 below provides a non-exhaustive listing of additional delivery vehicles in which embodiments of the present subject matter may be employed.

TABLE 5

| Types | Description |
|---|---|
| 12.5 bay | May come in either single or tandem axle. The single axle may have 4 full height bays, 2 short bays and 1 short half width bay on each side. The tandem axle may have 3 full height bays, 3 short bays and 1½ width bay over the king pin plate on each side. |
| 14 bay | This trailer may have 4 full height bays and 3 short bays on each side. |
| 14.5 bay | This trailer may have 5 full height bays, 2 short bays and 1 half bay on each side. |
| 16 bay | May come in either single or tandem axle. The single axle is a common trailer in use today. The tandem axles may have 4 full height bays and 4 short bays on each side. |
| 18 bay | May come in either single or tandem axle. The single axle may have 6 full height bays and 3 short bays on each side. |

TABLE 5-continued

| Types | Description |
|---|---|
| | The tandem axle may have 5 full height bays and 4 short bays on each side. |
| 20 bay | Tandem axle. This trailer may have 6 full height bays and 4 short bays on each side. |
| 22 bay | Tandem axle. This trailer may have 7 full height bays and 4 short bays on each side. |
| 24 bay | Tandem axle. This trailer may have 7 full height bays and 5 short bays on each side. |
| Stretch | These trailers may come in different sizes (16 bay most common). They may generally be modified by extending the king pin about 12 inches forward to allow enough clearance to convert one of the two short bays over the king pin plate in a standard trailer to a full height bay. |

TABLE 5-continued

| Types | Description |
| --- | --- |
| Combination | These trailers generally have one of the following: multiple bay widths, both roll-up and swing doors, and standard and insulated/isolated bays. |

Of course, the data above in Table 5 is exemplary only and should not limit the scope of the claims appended herewith. For example, it is envisioned that the width of exemplary bays may vary, e.g., from less than forty inches to over fifty two inches at full width and that certain exemplary vehicles may also provide multiple bay widths and/or may provide bays with fractions or multiples of full width bays. Additionally, it is envisioned that the height of exemplary bays may vary, e.g., from less than eighty two inches to over ninety inches at full height and that certain exemplary vehicles may also provide multiple bay heights and/or may provide bays with fractions or multiples of full height bays. Further, it is envisioned that the depth of exemplary bays may vary, e.g., from less than forty inches to over forty five inches at full depth and that certain exemplary vehicles may also provide multiple bay depths and/or may provide bays with fractions or multiples of full depth bays. It is also envisioned that embodiments of the present subject matter are applicable to delivery vehicles having a single door (rear or side-entry) and thus a single bay. Of course, a delivery vehicle having any number of bays and/or doors would fall within the scope of the claims appended herewith.

Figure 4:
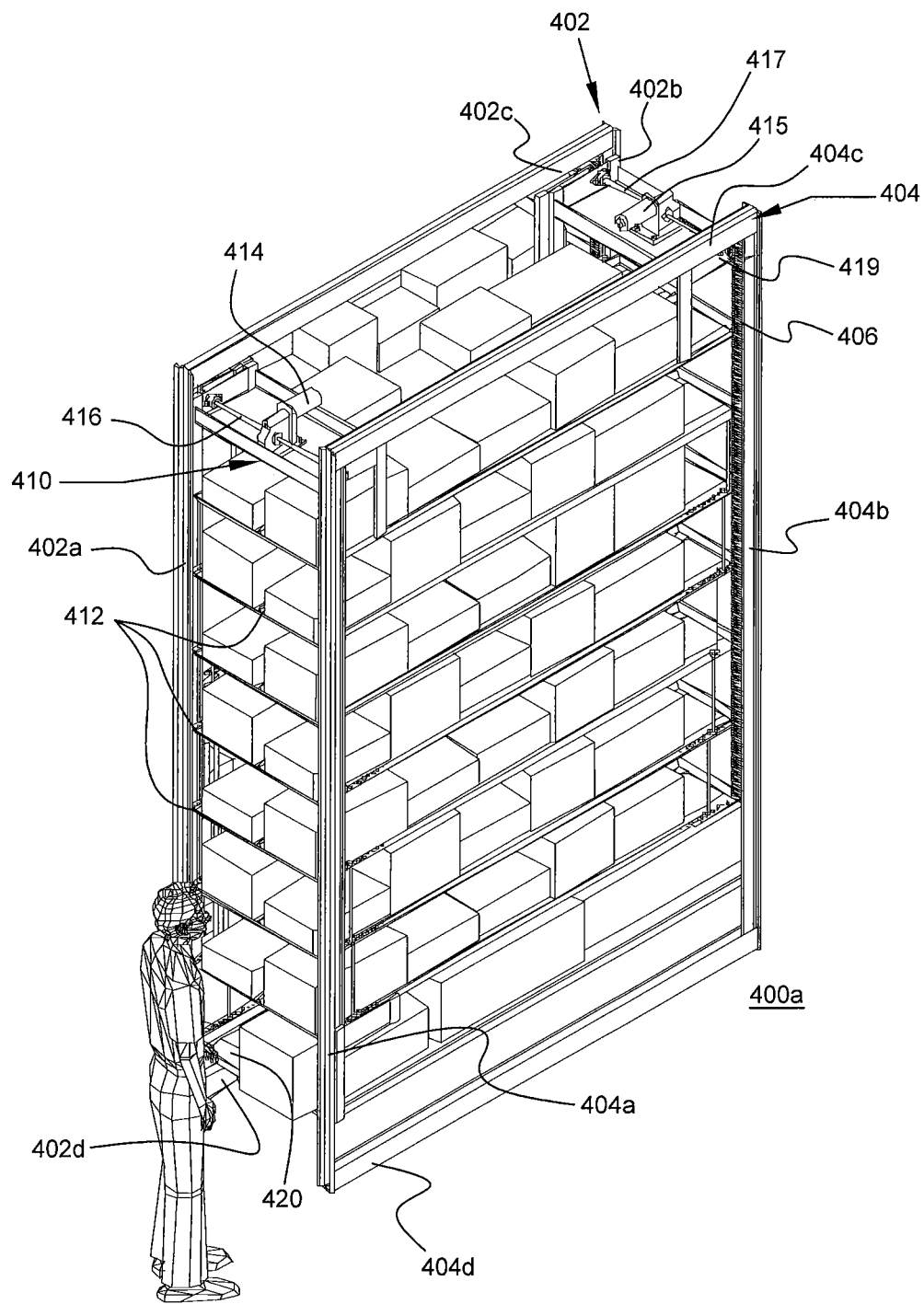
FIG. 4 is a perspective view of one embodiment of the present subject matter.
Figure 5:
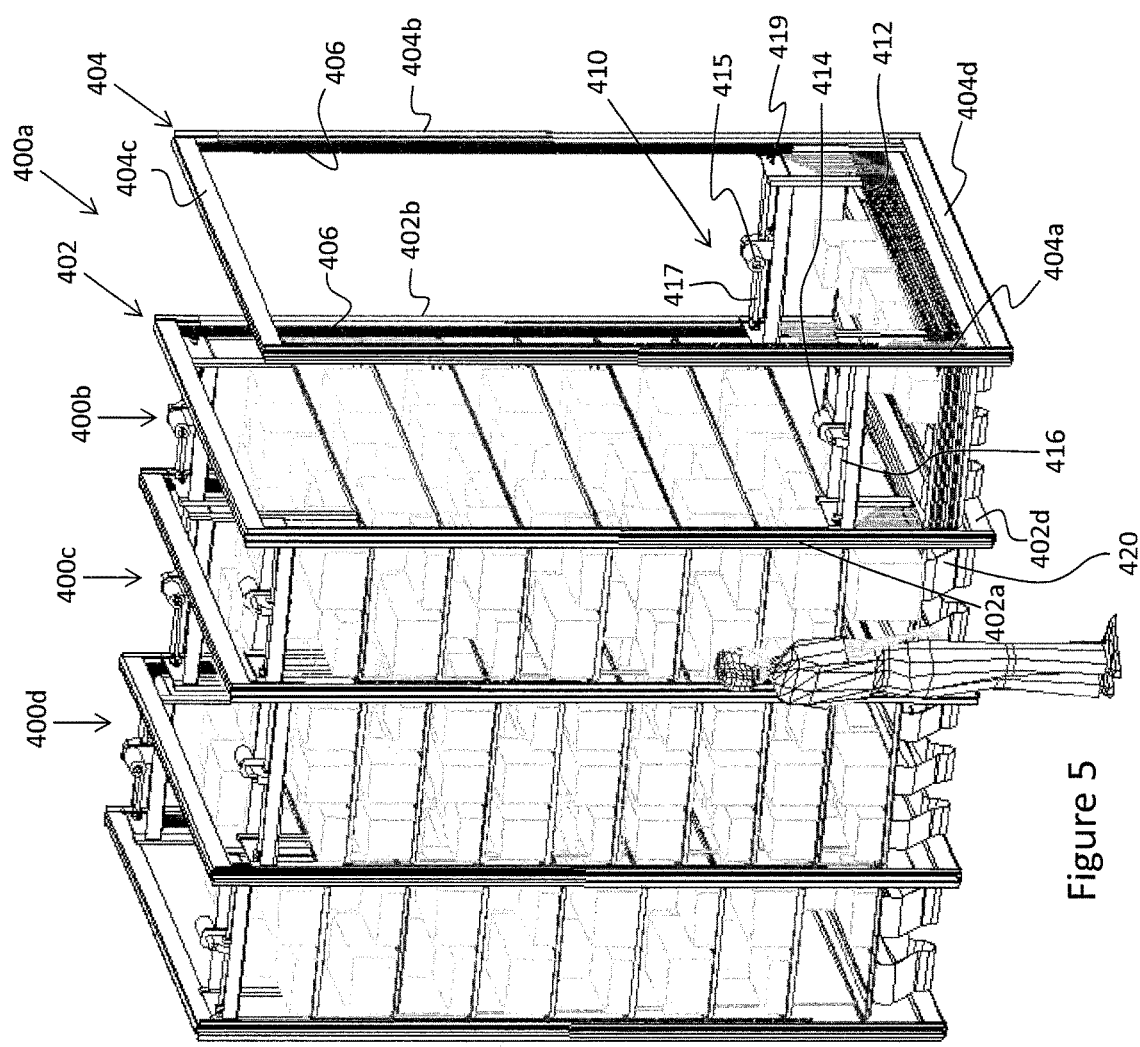
FIG. 5 is a perspective view of another embodiment of the present subject matter.
Figure 6:
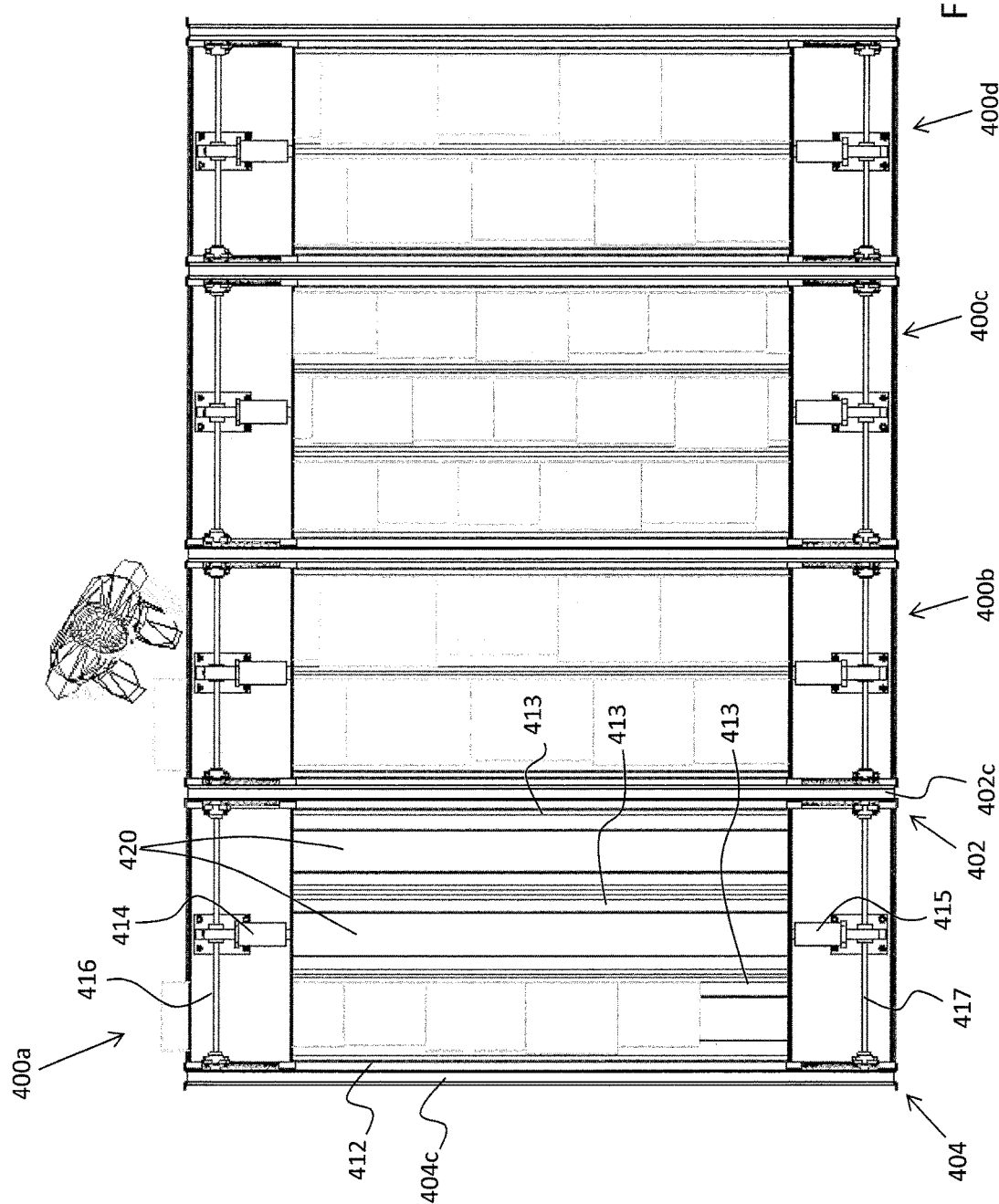
FIG. 6 is a top plan view of the embodiment of FIG. 5.
Figure 7:
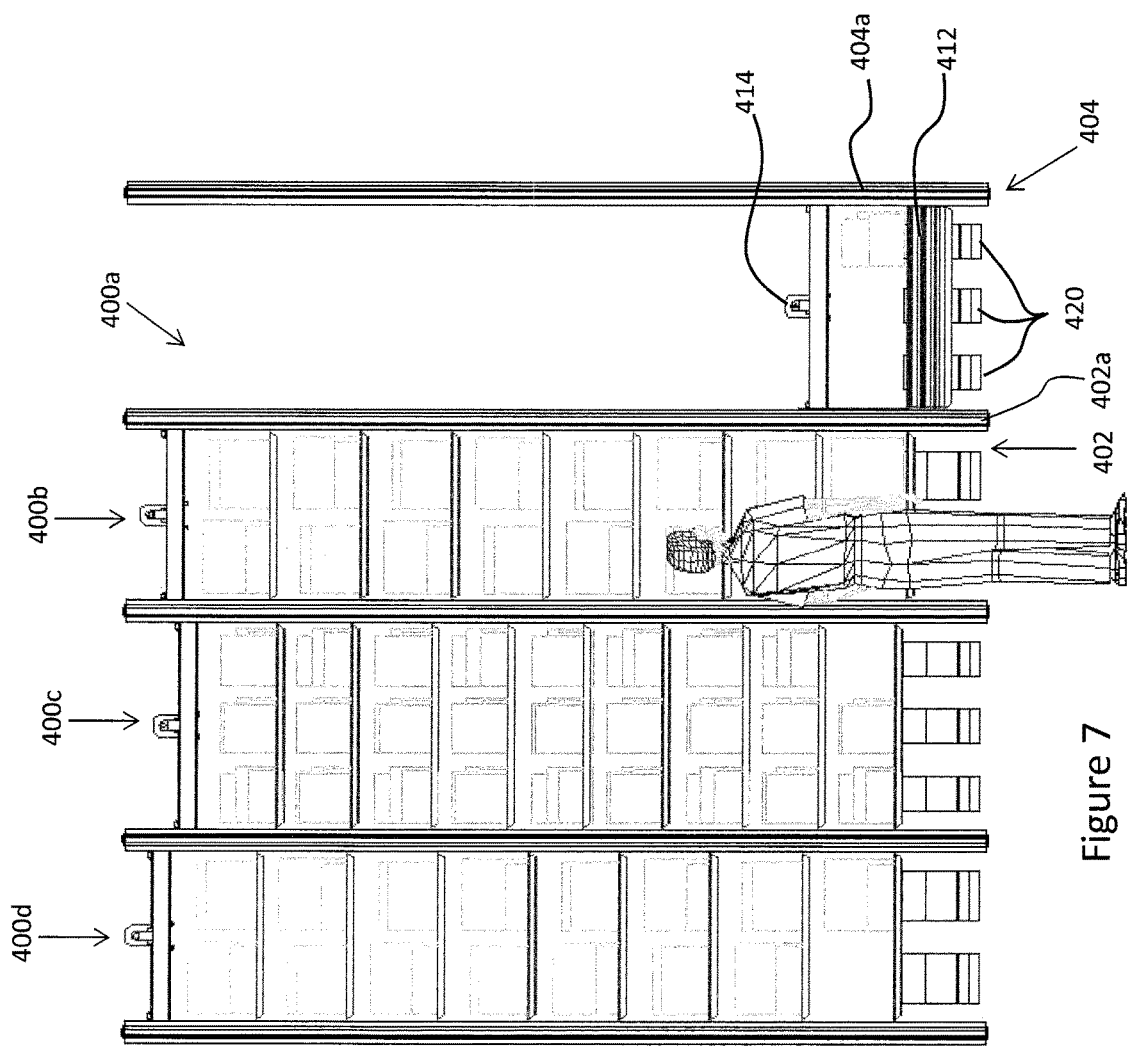
FIG. 7 is a front plan view of the embodiment of FIG. 5.
Figure 8:
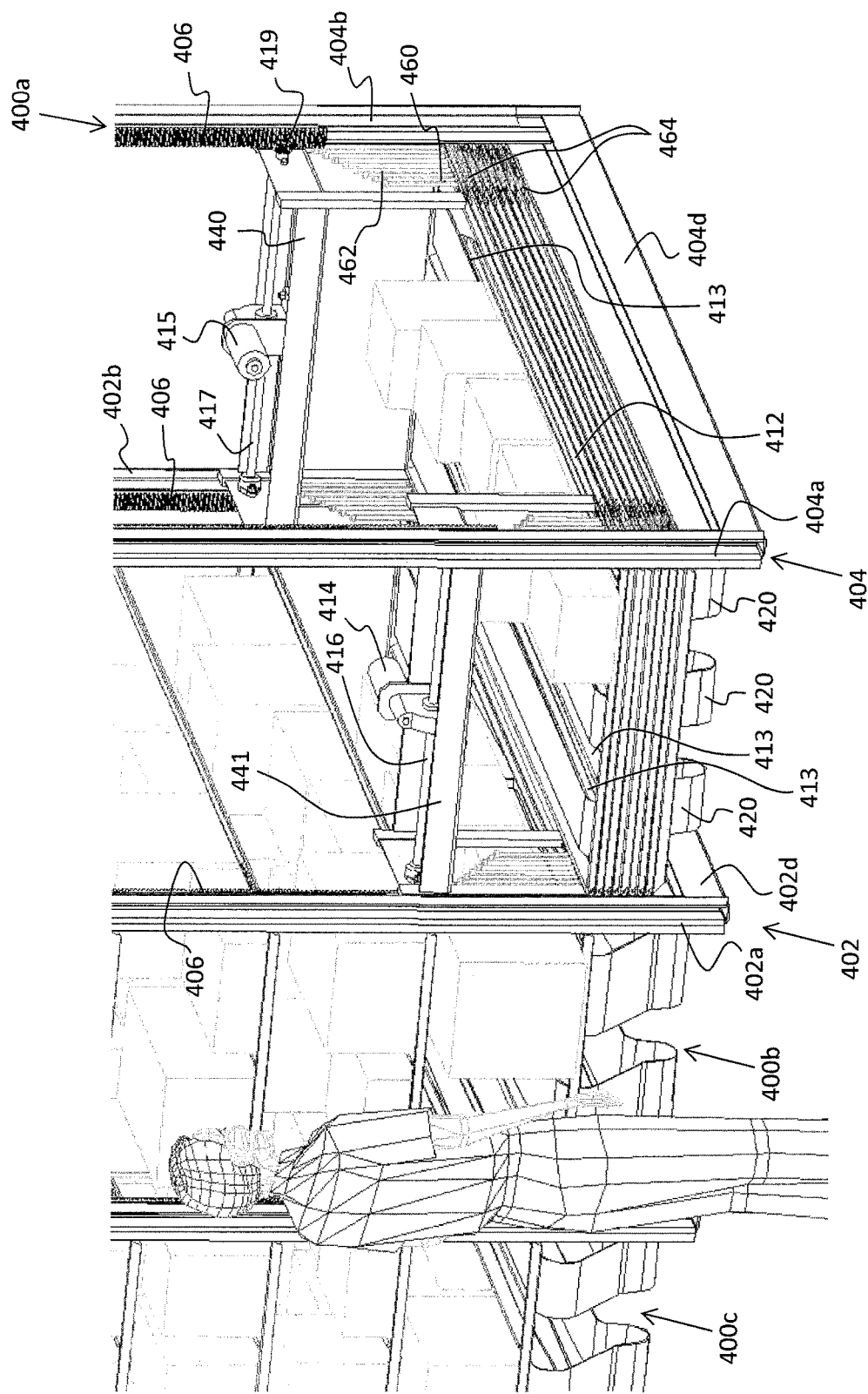
FIG. 8 is an additional perspective view of the embodiment of FIG. 5.

FIG. 4 is a perspective view of one embodiment of the present subject matter. FIG. 5 is a perspective view of another embodiment of the present subject matter. FIG. 6 is a top plan view of the embodiment of FIG. 5. FIG. 7 is a front plan view of the embodiment of FIG. 5. FIG. 8 is an additional perspective view of the embodiment of FIG. 5. For ease of reference and depiction, vehicular walls have been omitted in FIGS. 4-8. Further, it should be noted that FIGS. 5-8 depict embodiments having multiple frames and/or bays 400a-400d, and FIG. 4 depicts an embodiment having a single bay 400a. With reference to FIG. 4, any of the exemplary delivery vehicles depicted in FIGS. 1-3 and/or described above may include in any one or several of its respective bays a first rectangular frame 402 and a second rectangular frame 404. With reference to FIGS. 4-8, these rectangular frames 402, 404 may be substantially parallel and oppose and face the other and may each include two vertical members 402a, 402b, 404a, 404b, respectively, and may each include two horizontal members 402c, 402d, 404c, 404d, respectively. In embodiments having a plurality of bays 400a-400d such as FIGS. 5-8, adjacent bays may or may not share a rectangular frame. Exemplary bays may be standard bays, insulated bays or isolated bays depending upon the desired design. Further, it is envisioned that these rectangular frames may be collapsible upon and/or telescope with the other rectangular frames. In such an embodiment, the rectangular frames may be movably affixed to a track mechanism whereby once product in a first set of frames or a bay has been depleted, an adjacent bay or frame may collapse upon the first frame and the product in the adjacent frame(s) delivered as discussed further below.

Any or each of the vertical members 402a, 402b, 404a, 404b may include a linear gear 406 affixed thereto. The linear gear 406 may extend along any portion or the entire length of the respective vertical member. Confined within the two rectangular frames 402, 404 may be a holding structure 410. The holding structure 410 is preferably engaged by both of the rectangular frames 402, 404 and may include a horizontal frame 412 or tray adjacent each of the vertical members 402a, 402b, 404a, 404b of the rectangular frames 402, 404 at corners of the horizontal frame 412. Of course, a plurality of horizontal frames 412 or trays may be included in embodiments of the present subject matter and the depiction of eight trays in FIG. 4 should not in any way limit the scope of the claims appended herewith. Additionally, any number of the horizontal frames 412 may be partitioned into a number of horizontal bins 413. For example, in one embodiment the horizontal frame 412 may include three bins. Additional embodiments of the horizontal frame 412 may include one, two, four or more bins.

The holding structure 410 may also include one or more motors 414, 415 that engages a respective shaft 416, 417. The motor(s) 414, 415 may be removably affixed to a motor holding assembly 440, 441 which is affixed to an uppermost horizontal frame 412 or tray. Exemplary motors may be, but are not limited to electric motors, hydraulic motors and the like. Each end of the shaft 416, 417 may accept a gear 419 which rotatably engages the linear gear 406 of a respective and/or adjacent vertical member 402a, 402b, 404a, 404b. The shaft 416, 417 may extend through perforations or holes in a portion of the assembly 440, 441. The depiction, construction and spatial relationship of the motors, gears, shafts or linkages and motor holding assemblies are, of course, exemplary only and should not limit the scope of the claims appended herewith. In embodiments of the present subject matter having multiple horizontal frames or trays 412, operation of the one or more motors 414, 415 may collapse or telescope, depending upon the direction of vertical motion, adjacent horizontal frames 412 with respect to the other horizontal frames as depicted in bay 400a in FIGS. 4-8. For example, in an embodiment having a plurality of horizontal frames 412, to assist in a proper collapsing or telescoping of the horizontal frames 412, each frame may include an affixed guide pin or rod 460, the distal end thereof 462 being bulbous or having a stop. The guide pin 460 may extend through holes 464 in each frame 412 contained within the same bay 400a. Thus, when the motor(s) 414, 415 is actuated to increase, for example, the height of the holding structure 410, the upper most frame increases its height, engaging the stop at the distal end 462 of the rod 460 affixed to a second frame immediately below the upper most frame. As this second frame also increases its height, it will eventually engage the stop of the distal end 462 of another rod 460, this another rod 460 affixed to a third frame immediately below the second frame, and so forth. The same will hold true but in reverse when the frames collapse upon each other. Of course, the length of the guide pins 460 are adjustable to alter the final height or distance between adjacent frames, and the size of the stops or bulbous distal ends 462 of the pins 460 may vary to ensure that only a predetermined frame engage or allow the raising/lowering of a respective frame.

Confined within the two rectangular frames 402, 404 may also be one or more belts 420. The belt(s) 420 may be positioned between the lower horizontal members 402d, 404d of the two rectangular frames 402, 404. Of course, depending upon the number of bins 413 in the horizontal frame(s) 412, a corresponding number of belts 420 would be positioned between the respective frames 402, 404. For example, FIG. 4 provides a depiction of three bins 413 with the respective horizontal frame 412 and a corresponding number of belts 420, one for each bin. This example, however, should not limit the scope of the claims appended herewith as it is envisioned that any number of belts may be utilized for any number of respective horizontal frames 412 and their respective bins 413. Thus, operation of the motor(s) 414, 415 may provide vertical movement of the holding structure 410 within the confines of the two rectangular frames 402, 404, and operation of the belt(s) 420 may provide a lateral or horizontal movement within the confines of the rectangular frames 402, 404 and therefore movement of product or cargo from the respective horizontal frame 412 or bin 413 to an individual. Of course, the movement of each belt 420 may be independent of the others and such movement may be effected by a motor, electric, hydraulic or otherwise. It is envisioned that operation of the motors 414, 415 and hence the vertical movement be automated or manual. Additionally, it is envisioned that operation of the belt(s) 420 also be automated or manual. For example, as the lower level of product is depleted, the holding structure may be collapsed (automatically or manually), bringing the next level of product to the lower level. While embodiments of the present subject matter have been described as utilizing the holding structure above, the claims appended herewith should not be so limited as other mechanical assemblies are also envisioned such as pulley mechanisms, chain or chained mechanisms, hydraulic mechanisms and lifts, and so forth. Further, while access to the bays 400a-400d in FIGS. 4-8 may be interpreted as a side-access, the claims appended herewith should not be so limited as an embodiment having one or more bays may be included in a vehicle having only rear-access to the cargo therein. Of course, access to the bays 400a-400d may be via a roll-up or swing door.

Figure 9B:
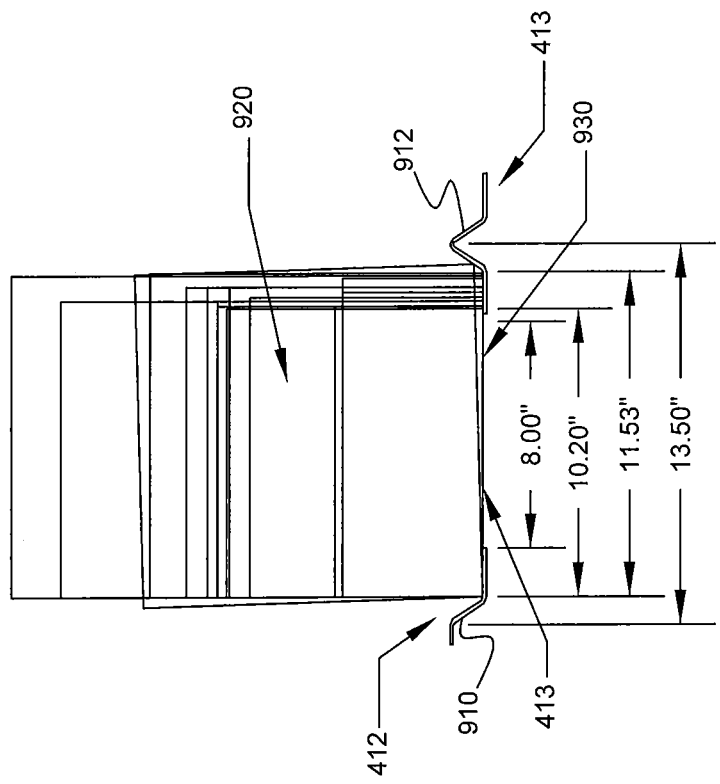
FIGS. 9A and 9B are illustrations of horizontal frames according to embodiments of the present subject matter.
Figure 9A:
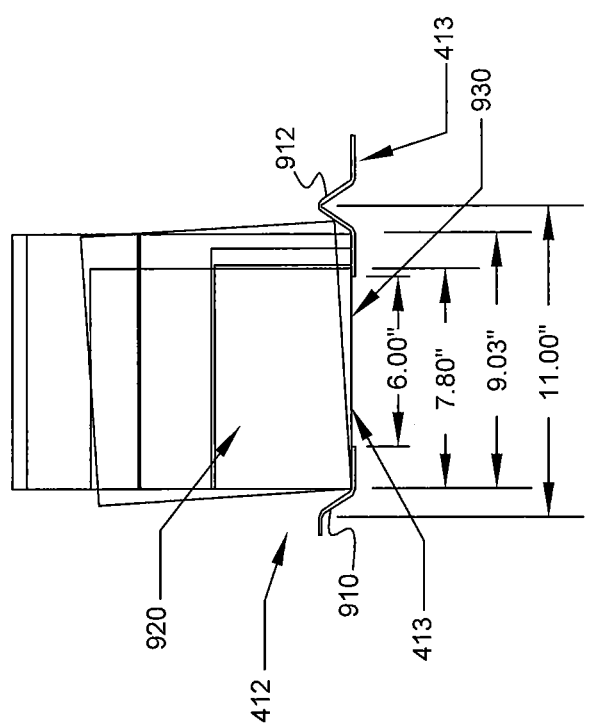
Figure 10:
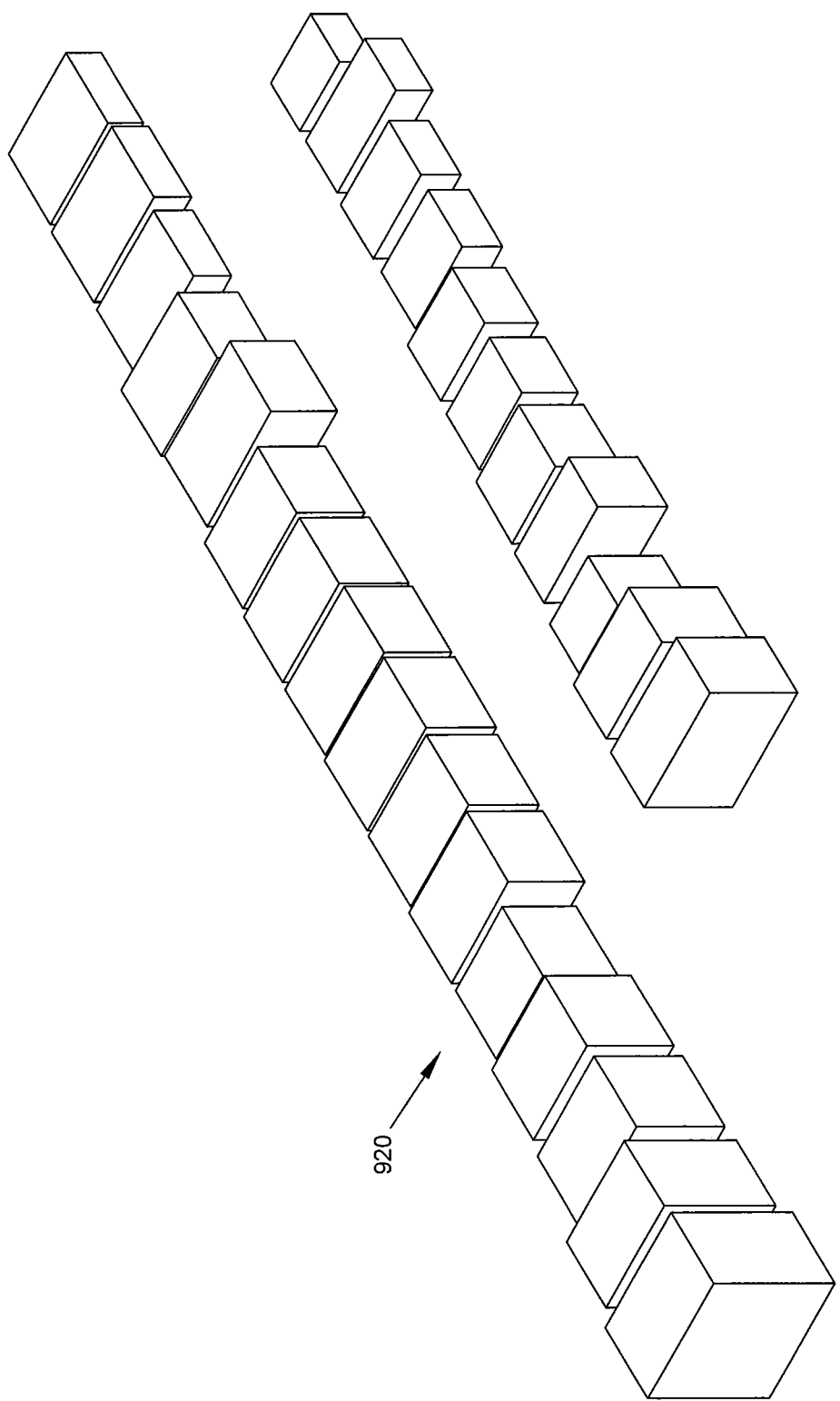
FIG. 10 is a perspective view of exemplary products or cargo embodiments of the present subject matter may accommodate.

FIGS. 9A and 9B are illustrations of horizontal frames according to embodiments of the present subject matter. With reference to FIGS. 9A and 9B, an exemplary horizontal frame 412 or tray may include ridges or raised portions 910 to keep cargo or product 920 situated on the horizontal frame 412. In embodiments of the present subject matter where the horizontal frame 412 includes plural bins 413, a separating ridge 912 may be provided between bins 413 to keep product in adjacent bins from interfering with each other. To accommodate an underlying belt 420 (not shown), the horizontal frame 412 and separate bins 413 may provide an opening 930 in which a belt 420 can contact product 920 situated on the horizontal frame 412 or bin 413 and provide lateral movement of such product 920. Of course, the width of the opening 930 may be adjustable to accommodate product (e.g., cases and the like) of varying dimensions. The width of the opening 930 may also be fixed and not adjustable. FIG. 10 is a perspective view of exemplary dimensions of product 920 or cargo embodiments of the present subject matter may accommodate. With reference to FIGS. 9A, 9B and 10, it is apparent that through the adjustment of the width opening 930, embodiments of the present subject matter may accept, accommodate and deliver to an individual product 920 or cargo having a wide variety of dimensions. Of course, the product 920 illustrated in FIGS. 9A, 9B and 10 are exemplary only and should not limit the scope of the claims appended herewith. For example, Table 6 below provides common dimensions for certain beverage products utilized in the industry. Generally, these products possessed heights ranging from 5.5 inches to approximately 12.5 inches.

TABLE 6

| Product | Cases per day | % Cases per day | Accum % Cases per day | Case Width (in) | Case Length (in) |
|---|---|---|---|---|---|
| Lite 24 pk can | 574 | 8.5 | 8.5 | 10.8 | 16.1 |
| Corona 12 pk ln 2 | 245 | 3.6 | 12.1 | 11.0 | 16.0 |

TABLE 6-continued

| Product | Cases per day | % Cases per day | Accum % Cases per day | Case Width (in) | Case Length (in) |
|---|---|---|---|---|---|
| Lite 6 pk ln 4 | 231 | 3.4 | 15.5 | 10.5 | 15.5 |
| High Life 24 pk can | 211 | 3.1 | 18.6 | 10.8 | 16.1 |
| Steel reserve 24 oz can 12 pk | 175 | 2.6 | 21.2 | 9.0 | 12.0 |
| Best lt. 24 pk can | 172 | 2.5 | 23.7 | 10.8 | 16.1 |
| Lite 12 pk ln2 | 166 | 2.4 | 26.2 | 10.5 | 15.5 |
| High Life 12 pk ln2 | 165 | 2.4 | 28.6 | 10.5 | 15.5 |
| Lite 18 pk can | 162 | 2.4 | 31.0 | 7.9 | 15.6 |
| Lite 20/12 lnnr | 160 | 2.4 | 33.3 | 10.3 | 12.9 |
| Lite Fridge 12 pk can | 138 | 2.0 | 35.4 | 10.8 | 16.1 |
| Best Ice 24 pk can | 125 | 1.9 | 37.2 | 10.8 | 16.1 |
| Red Bull Energy Drink | 123 | 1.8 | 39.1 | 9.0 | 13.0 |
| Corona 6 pk ln/4 | 122 | 1.8 | 40.9 | 11.0 | 16.0 |
| High Life 40 oz nr 12 | 106 | 1.6 | 42.4 | 11.8 | 15.4 |
| Best Ice 12 pk can 2 | 96 | 1.4 | 43.8 | 7.9 | 10.5 |
| Icehouse 24 oz can/12 | 88 | 1.3 | 45.1 | 9.0 | 12.0 |
| Best 24 pk cans | 85 | 1.3 | 46.4 | 10.8 | 16.1 |
| Icehouse 24 pk can | 81 | 1.2 | 47.6 | 10.8 | 16.1 |
| Icehouse 12 pk ln 2 | 74 | 1.1 | 48.7 | 10.5 | 15.5 |
| Icehouse 22 oz nr 15 | 73 | 1.1 | 49.8 | 9.0 | 15.0 |
| Best lt. 12 pk can 2 | 70 | 1.0 | 50.8 | 7.9 | 10.5 |
| Icehouse 18/12 lnnr | 69 | 1.0 | 51.8 | 7.8 | 15.0 |
| High Life Fridge pack (2/12) | 67 | 1.0 | 52.8 | 10.8 | 16.1 |
| Canada Dry Ginger Ale 8/2 L | 66 | 1.0 | 53.8 | 10.0 | 19.0 |
| High Life 6 pk ln 4 | 65 | 1.0 | 54.7 | 10.5 | 15.5 |
| Icehouse 6 pk ln | 63 | 0.9 | 55.7 | 10.5 | 15.5 |

Of course, the data above in Table 6 is exemplary only and should not limit the scope of the claims appended herewith as embodiments of the present subject matter may accommodate cargo and product from a variety of industries (dairy, vending machine, bakery, snack food, etc.) having a variety of dimensions.

Figure 11:
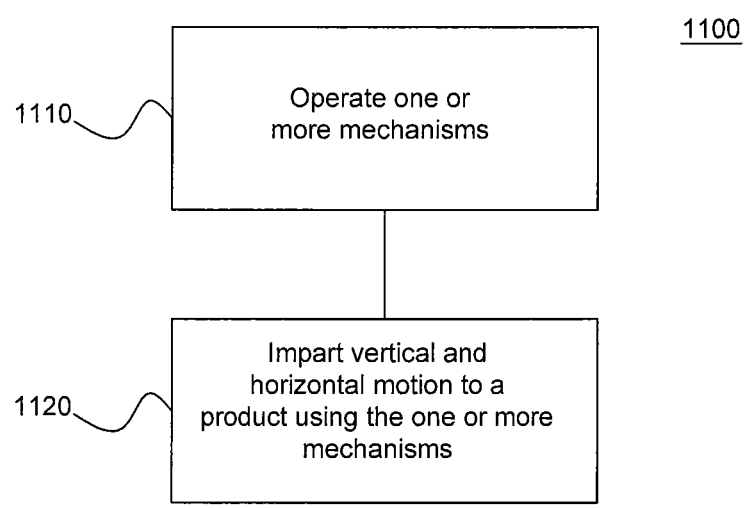
FIG. 11 is a block diagram of one embodiment of the present subject matter.

FIG. 11 is a block diagram of one embodiment of the present subject matter. With reference to FIG. 11, a method 1100 for loading products in a vehicle and/or delivering products to an individual or customer may include at step 1110, operating one or more mechanisms and at step 1120 imparting vertical and lateral motion to a product within a bay of the vehicle using the one or more mechanisms. Exemplary vehicles may include any of the aforementioned and described delivery vehicles and may include at least one bay having two exemplary rectangular frames as described above, each frame with two horizontal members and two vertical members and each frame opposing and facing the other. The bay may also include an exemplary holding structure as described above engaged by both of the rectangular frames, the structure comprising one or more horizontal trays having the product contained thereon. In one embodiment, one of the mechanisms may be a motor, the operation of which would collapse or telescope the one or more horizontal trays in a vertical motion. In another embodiment, one of the mechanisms may be a belt, the operation of which would laterally move the product from the one or more horizontal trays. Of course, this lateral and/or vertical movement may be automatic or manual.

Figure 12:
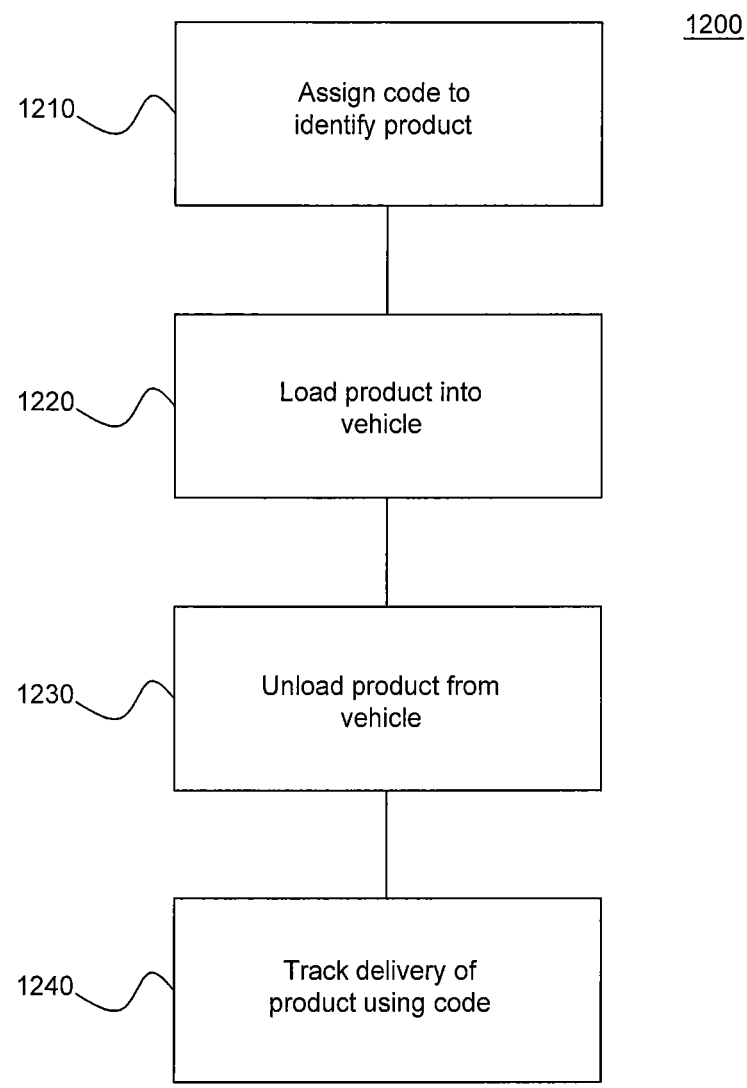
FIG. 12 is a block diagram of another embodiment of the present subject matter.

FIG. 12 is a block diagram of another embodiment of the present subject matter. With reference to FIG. 12, a method 1200 for tracking the delivery of products to a customer may include at step 1210 assigning a code to identify a product and at step 1220 loading the product into a delivery vehicle. The vehicle may include one or more delivery bays having vertical frames carrying a holding structure and having a belt assembly as described above. Exemplary codes may be, but are not limited to a Stock-Keeping Unit (SKU), an Universal Product Code (UPC), an European Article Number (EAN), a Global Trade Item Number (GTIN), Price look-up (PLU) code, and an Australian Product Number (APN). The method 1200 may further include at step 1230 unloading the product from the delivery vehicle and at step 1240 tracking the delivery of the product using the code. Of course, one or both of steps 1220 or 1230 may include providing vertical movement of the product using the holding structure and providing lateral movement using the belt assembly with the one or more delivery bays of the vehicle. In one embodiment, either or both of the vertical or horizontal movement may be automatic or manual. In a further embodiment, any such automated or automatic movement may be a function of the assigned code. For example, it is envisioned that an individual or operator may, upon unloading (or loading) product within a bay in the vehicle, input into a handheld device or device affixed to the vehicle, a specific SKU or series of SKUs. The device would communicate wirelessly or via a wired connection with a database or memory unit and the location of the product(s) corresponding to the SKU or series of SKUs would be found. Depending upon such location, the product(s) would then be delivered (or loaded), automatically or manually, to (or from) the individual or operator in accordance with the vertical and lateral movement described in previous paragraphs.

Thus, utilizing embodiments of the present subject matter, little to no time is wasted at a delivery opening doors and/or searching for products as the products are presented to an individual thereby eliminating any wasted time of handling cases to get to the cases needed for a delivery. Further, an increase in efficiency of the distribution process may be seen through an increased number of deliveries within a current geographic territory and/or an increase in the geographic area covered by a single delivery vehicle. Additionally, as products are presented to an individual employee at waist or ground level, ergonomic-related issues such as ergonomic-related injury costs are eliminated. Furthermore, maximum payload may be increased in each delivery vehicle design utilizing embodiments of the present subject matter. Exemplary embodiments may also accommodate case size proliferation associated with new packages thereby allowing the vehicle designs to accommodate smaller/larger order quantities without penalizing overall vehicle capacity.

It is therefore an aspect of embodiments of the present subject matter to overcome the limitations in the current delivery industry (e.g., delivering product for the beverage, dairy, vending machine, bakery, snack food, etc., industries) and provide a dynamic solution that keeps pace with and accommodates growing product portfolios and/or package dimensions and increasing customer demands. Other aspects of embodiments of the present subject matter are to improve performance, increase delivery vehicle capacity, maximize cubic space available on a delivery vehicle, and reduce cost of product deliveries by providing a material change to the design of delivery vehicles. Thus, embodiments of the present subject matter may provide products to a delivery driver at ground or waist level in a forward most position, thus minimizing the number of door openings/closings and eliminating the excessive strain and stress upon the delivery driver.

While the description above may reference or provide exemplary trucks or side-bay delivery vehicles, this should not be interpreted as limiting the scope of the claims appended herewith. As is known to those of skill in the art, other exemplary vehicles may include rear-loaded or combination side-bay and/or rear-bay or rear-loaded vehicles (e.g., hybrid), trucks, vans and other such wheeled vehicles. Additionally, while the following description may reference beverage containers, cases and the like, this also should not limit the scope of the claims appended herewith as embodiments of the present subject matter are equally applicable to containers, cases, product, and/or cargo for delivery vehicles in the dairy industry, vending machine industry, bakery industry, snack food industry, and any industry, whether consumable or otherwise, that may utilize a side-bay and/or rear-loaded delivery vehicle.

As shown by the various configurations and embodiments illustrated in FIGS. 1-12, an ergonomically improved delivery vehicle and method have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A side-bay delivery vehicle, comprising:
   one or more bays comprising:
   two parallel rectangular frames, each frame having two horizontal members and two vertical members and each of the frames opposing and facing the other;
   a holding structure engaged by both of the rectangular frames, the structure comprising:
   a first horizontal frame adjacent to each of the vertical members of the two rectangular frames at corners of the first horizontal frame, the first horizontal frame extending in first and second orthogonal directions between the two rectangular frames, the first horizontal frame comprising an opening extending in the first direction in the first horizontal frame and between the horizontal members of the two rectangular frames; and
   a first mechanism; and
   a second mechanism positioned below the first horizontal frame, the second mechanism configured to provide lateral movement in the first direction along the opening in the first horizontal frame and toward each opposing side of the vehicle;
   wherein the first mechanism is configured to provide vertical movement of the first horizontal frame within the confines of the two rectangular frames; and
   wherein access to the one or more bays is from one of the opposing sides of the vehicle; and wherein the opposing sides of the vehicle are along a longitudinal axis of the vehicle.

2. The delivery vehicle of claim 1, wherein the first horizontal frame comprises a plurality of openings extending in the first direction-in the first horizontal frame.

3. The delivery vehicle of claim 2, further comprising a third mechanism positioned below the first horizontal frame, the third mechanism configured to provide lateral movement in the first direction along a second one of the plurality of openings in the first horizontal frame and toward each opposing side of the vehicle.

4. The delivery vehicle of claim 3, wherein each of the second and third mechanisms are configured to provide independent, lateral movement in the first direction along the respective opening in the first horizontal frame and toward each opposing side of the vehicle.

5. The delivery vehicle of claim 1,
   wherein the holding structure further comprises a second horizontal frame adjacent to each of the vertical members of the two rectangular frames at corners of the second horizontal frame, the second horizontal frame extending in the first and second orthogonal directions and comprising an opening extending in the first direction and between the horizontal members of the two rectangular frames;

wherein the first mechanism is further configured to collapse the second horizontal frame onto the first horizontal frame or telescope the second horizontal frame from the first horizontal frame; and wherein the second mechanism is further configured to provide lateral movement in the first direction along the opening in the second horizontal frame and toward each opposing side of the vehicle.

6. The delivery vehicle of claim 5, wherein the first and second horizontal frames are each configured to support a respective plurality of products situated over the respective opening in the respective horizontal frame;

wherein the first horizontal frame is disposed below the second horizontal frame;

wherein the lateral movement toward the one of the opposing sides of the vehicle is configured to successively deliver, from the first horizontal frame, the plurality of products situated over the opening in the first horizontal frame; and wherein the first mechanism is further configured to collapse the second horizontal frame into the first horizontal frame when the last of the plurality of products is delivered from the first horizontal frame.

7. The delivery vehicle of claim 5, wherein each horizontal frame comprises an affixed guide pin, the distal end of the guide pin having a stop, wherein the length of the guide pins is adjustable to alter the final collapsed or telescoped distance between the first and second horizontal frames.

8. The delivery vehicle of claim 1, wherein the delivery vehicle comprises a plurality of bays, and wherein respective holding structures in adjacent bays are each engaged by the same rectangular frame, and wherein access to the adjacent bays is from the one of the opposing sides of the vehicle.

9. A method for loading products to and delivering products from a side-bay delivery vehicle, comprising:

operating a first mechanism to impart motion in a first direction to one of a plurality of horizontal frames extending in second and third orthogonal directions between two rectangular frames of a holding structure disposed in a bay of the delivery vehicle, wherein access to the bay is provided from one side along a longitudinal axis of the delivery vehicle, wherein the first direction is normal to the second and third directions, and wherein each of the plurality of horizontal frames comprises an opening extending in the second direction in the respective horizontal frame; and operating a second mechanism to impart lateral motion in the second direction along the opening of one or more of the plurality of horizontal frames, wherein the lateral motion toward the one side of the vehicle is configured to deliver one or more products from one of the plurality of horizontal frames, and wherein the lateral motion toward the opposing side of the vehicle is configured to load one or more products onto one of the plurality of horizontal frames.

10. The method of claim 9, wherein each of the rectangular frames comprises at least two members extending in the first direction, and at least two members extending in the second direction, and wherein each of the rectangular frames opposes and faces the other; and wherein the second mechanism comprises a belt.

11. The method of claim 9, wherein each of the plurality of horizontal frames comprises a plurality of openings extending in the second direction.

12. The method of claim 11, wherein the step of operating the second mechanism further comprises operating a respective one of a plurality of second mechanisms to impart independent, lateral motion in the second direction along a respective one opening of the plurality of openings of the one or more of the plurality of horizontal frames.

13. The method of claim 9, wherein the one or more products comprises a plurality of products, and wherein each of the plurality of products is situated over, or is configured to be situated over, the opening of the one or more of the plurality of horizontal frames.

14. The method of claim 13, further comprising:

assigning a code to identify the product; and tracking the delivery of the product using the assigned code, wherein at least one of the operating the first mechanism or the operating the second mechanism is performed as a function of the assigned code.

15. A system for loading products to and delivering products from a side along a longitudinal axis of a side-bay delivery vehicle, comprising:

two frames, each frame having at least two members extending in a first direction and at least two members extending in a second direction normal to the first direction, and each frame opposing and facing the other;

a holding structure engaged by the two frames, the structure comprising a plurality of horizontal frames extending between the two frames in the second direction and a third direction orthogonal to the second direction, wherein each of the plurality of horizontal frames comprises one or more openings extending in the second direction in the respective horizontal frame, and wherein each of the plurality of horizontal frames is configured to support one or more non-palletized products in the second and third orthogonal directions;

a first mechanism configured to provide movement of the plurality of horizontal frames of the holding structure within the confines of the two frames and in the first direction; and one or more-second mechanisms positioned between the two frames, the one or more second mechanisms configured to provide lateral movement toward each opposing edge of the plurality of horizontal frames in the second direction and along the one or more openings of the plurality of horizontal frames;

wherein the lateral movement toward one of the opposing edges of the plurality of horizontal frames is configured to deliver, from one of the plurality of horizontal frames and at a side of the holding structure, at least one of a respective one or more non-palletized products supported on the one of the plurality of horizontal frames and at an ergonomically advantageous position relative to a user; and wherein the lateral movement toward the other one of the opposing edges of the plurality of horizontal frames is configured to load at least one of a respective one or more non-palletized products onto one of the plurality of horizontal frames at the side of the holding structure and from an ergonomically advantageous position relative to a user.

16. The system of claim 15, wherein each of the one or more second mechanisms comprises a belt, and wherein the first mechanism comprises a motor.

17. The system of claim 15,
wherein the one or more openings comprises a plurality of openings;
wherein the one or more second mechanisms comprises a plurality of second mechanisms, each one of the plurality of second mechanisms configured to provide independent, lateral movement in the second direction toward each opposing edge of the plural horizontal frames and along a different respective opening of the plurality of openings of the plural horizontal frames.

18. The system of claim 17, wherein the respective width of each of the pluality of openings is adjustable in the second direction.

19. The system of claim 15,
wherein each of the plurality of horizontal frames is configured to support a respective plurality of non-palletized products in each of the second and third orthogonal directions.

20. The system of claim 15, further comprising the delivery vehicle, wherein the delivery vehicle comprises one or more bays, wherein access to each of the one or more bays is provided from one side along the longitudinal axis of the delivery vehicle, and wherein the two frames, the holding structure, the first mechanism, and the plurality of second mechanisms are disposed in at least one bay of the one or more bays.

* * * * *